(12) United States Patent
Pau et al.

(10) Patent No.: US 12,313,468 B2
(45) Date of Patent: May 27, 2025

(54) ACHROMATIC AND POLARIZATION ADAPTIVE OPTICS SYSTEM

(71) Applicant: Arizona Board of Regents on Behalf of the University of Arizona, Tucson, AZ (US)

(72) Inventors: Stanley Pau, Tucson, AZ (US); Michael Hart, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 196 days.

(21) Appl. No.: 17/996,872

(22) PCT Filed: Apr. 20, 2021

(86) PCT No.: PCT/US2021/028232
§ 371 (c)(1),
(2) Date: Oct. 21, 2022

(87) PCT Pub. No.: WO2021/216602
PCT Pub. Date: Oct. 28, 2021

(65) Prior Publication Data
US 2023/0160752 A1    May 25, 2023

Related U.S. Application Data

(60) Provisional application No. 63/013,127, filed on Apr. 21, 2020.

(51) Int. Cl.
*G01J 9/00* (2006.01)
*G01J 3/02* (2006.01)
(Continued)

(52) U.S. Cl.
CPC .............. *G01J 9/00* (2013.01); *G01J 3/0224* (2013.01); *G01J 3/12* (2013.01); *G01J 4/00* (2013.01);
(Continued)

(58) Field of Classification Search
CPC .... G01J 9/00; G01J 3/0224; G01J 3/12; G01J 4/00; G01J 2003/1213; G02B 26/06;
(Continued)

(56) References Cited

U.S. PATENT DOCUMENTS

| 4,943,709 A | 7/1990 | Grinberg et al. |
| 5,684,545 A | 11/1997 | Dou et al. |

(Continued)

FOREIGN PATENT DOCUMENTS

| KR | 20210001615 A | 1/2021 | |
| WO | WO-9732182 A1 * | 9/1997 | ......... A61B 1/00096 |
| WO | 2019182728 A1 | 9/2019 | |

OTHER PUBLICATIONS

A. A. Voronin and A. M. Zheltikov, "The generalized Sellmeier equation for air," Scientific Reports 7:46111 (2017).
(Continued)

Primary Examiner — Md M Rahman
(74) Attorney, Agent, or Firm — Perkins Coie

(57) ABSTRACT

Methods, systems and devices are disclosed to detect and compensate wavefront errors associated with light that spans a large range of wavelengths and different polarization states. One example system includes an optical wavefront sensor that is positioned to receive input light after propagation through a turbulent medium, such as air or water or other liquids, and to detect a wavefront error associated with at least one spectral component of the received light that has a plurality of spectral components. The system further includes a wavefront compensator that is positioned to
(Continued)

receive the input light and to simultaneously effectuate wavefront corrections for the plurality of spectral components of the input light based on the detected wavefront error.

21 Claims, 13 Drawing Sheets

(51) Int. Cl.
    *G01J 3/12*     (2006.01)
    *G01J 4/00*     (2006.01)
    *G02B 26/06*     (2006.01)
    *G02B 27/00*     (2006.01)

(52) U.S. Cl.
    CPC .......... *G02B 26/06* (2013.01); *G02B 27/0037* (2013.01)

(58) Field of Classification Search
    CPC ............ G02B 27/0037; G02B 26/0825; G02B 26/0833; G02F 2201/307
    USPC .......................................................... 356/364
    See application file for complete search history.

(56) References Cited

U.S. PATENT DOCUMENTS

| | | |
|---|---|---|
| 6,154,318 A | 11/2000 | Austin et al. |
| 7,019,888 B1 | 3/2006 | Graves et al. |
| 7,206,117 B2 | 4/2007 | Aksyuk et al. |
| 9,057,604 B1 * | 6/2015 | Fink ........................ G01S 7/497 |
| 10,795,138 B2 * | 10/2020 | Engelhardt ........ G02B 21/0032 |
| 2008/0042042 A1 * | 2/2008 | King ........................ H01S 3/005 |
| | | 250/201.9 |
| 2010/0195048 A1 * | 8/2010 | Hammer ............. A61B 3/1025 |
| | | 351/246 |
| 2016/0038024 A1 * | 2/2016 | Zhou ...................... A61B 3/113 |
| | | 351/206 |

OTHER PUBLICATIONS

Matuschek et al., "Design and fabrication of double-chirped mirrors", Opt. Lett. 22 (11), 831 (1997), doi: 10.1364/OL.22.000831.
International Search Report and Written Opinion mailed Sep. 22, 2021 for International Patent Application No. PCT/US2021/028232 (19 pages).
P. E. Ciddor, "Refractive index of air: new equations for the visible and near infrared," Appl. Optics 35, 1566-1573 (1996).
V. Pervak et al., "Dispersion control over the ultraviolet-visible-near-infrared spectral range with HfO2/SiO2-chirped dielectric multilayers", Opt. Lett. 32 (9), 1183 (2007), doi: 10.1364/OL.32.001183.
X. Tu and S. Pau, "Optimized design of N optical filters for color and polarization imaging," Optics Express 24, 3011 (2016).

* cited by examiner

ACHROMATIC AND POLARIZATION ADAPTIVE OPTICS SYSTEM

RELATED APPLICATIONS

This patent document is a 371 National Phase Application of International Patent Application No. PCT/US2021/028232, filed Apr. 20, 2021, which claims priority to the provisional application with Ser. No. 63/013,127, titled "Achromatic and Polarization Adaptive Optics System," filed Apr. 21, 2020. The entire contents of the above noted applications are incorporated by reference as part of the disclosure of this document.

TECHNICAL FIELD

The subject matter of this patent document wave front sensing and in particular to systems, methods and devices that detect and correct wave front errors.

BACKGROUND

Wavefront sensing is a class of optical techniques used to measure aberrations that lead to image blurring. Wavefront sensing allows determination of wavefront distortions as seen by an optical system looking through a turbulent medium, such as the Earth's atmosphere or a body of water, and subsequent correction of the aberrations in the optical wavefront. A wavefront sensor is a critical component of an adaptive optics system, with applications in astronomy, telescope design, remote sensing, biomedical imaging, microscopy, high energy optical pulse propagation, laser communication systems, optical fabrication and testing, retinal imaging systems, and others. Therefore, there is a need to provide improved wavefront detection and compensation that can be used in a wide range of applications and optical systems.

SUMMARY OF CERTAIN EMBODIMENTS

The disclosed embodiments, among other features and benefits, enable detection and compensation of wavefront errors for light that spans a large range of wavelengths and/or different polarization states.

One example system includes an optical wavefront sensor positioned to receive input light after propagation through a turbulent medium and to detect a wavefront error associated with at least one spectral component of the received light, where the input light has a plurality of spectral components. The system further includes a wavefront compensator positioned to receive the input light and to simultaneously effectuate wavefront corrections for the plurality of spectral components of the input light based on the detected wavefront error. The system additionally includes a processor and a memory including instructions stored thereon that, upon execution by the processor, configure the processor to receive information indicative of the detected wavefront error, and to provide information to the wavefront compensator to effectuate the wavefront corrections for the plurality of spectral components.

DETAILED DESCRIPTION

Figure 1:
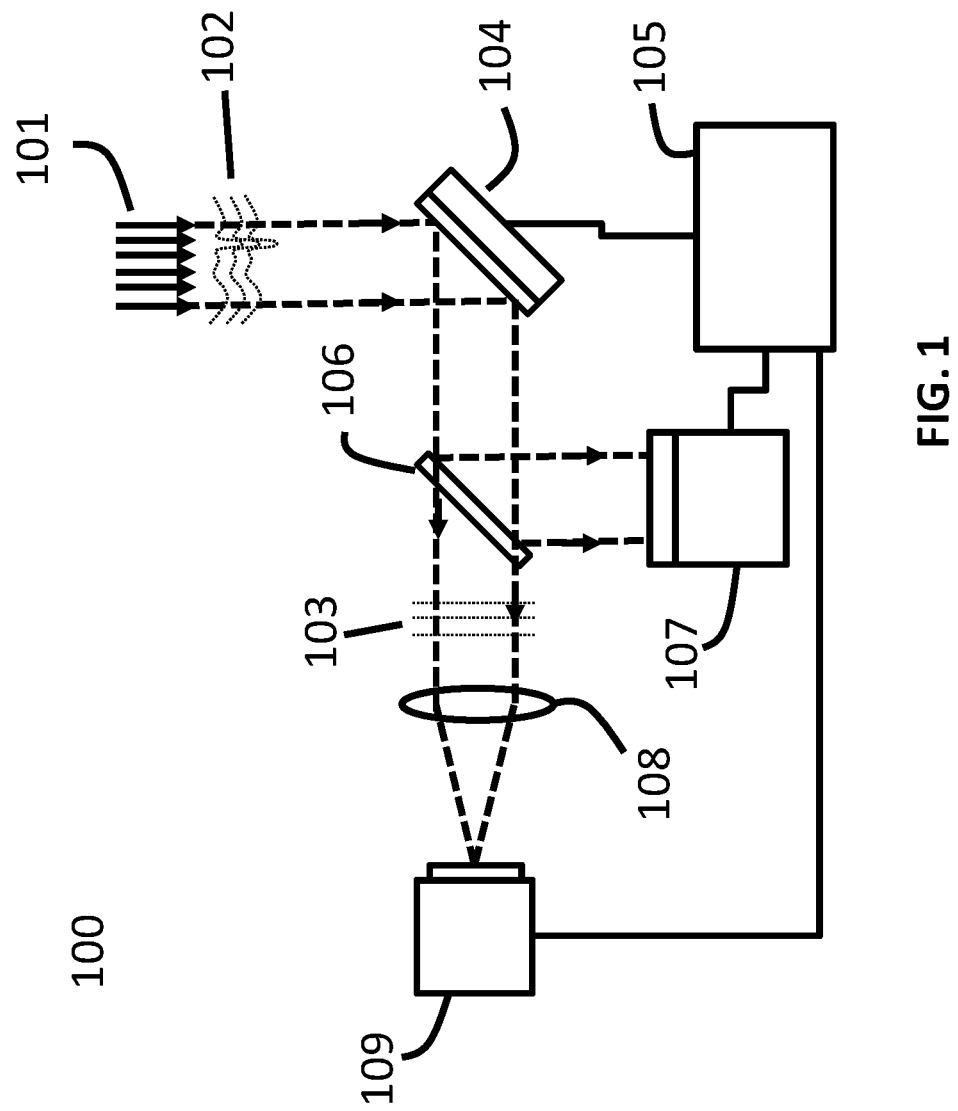
FIG. 1 illustrates an example configuration of an adaptive optics (AO) system that includes a wavefront sensor and a wavefront compensator.

FIG. 1 shows an example configuration of an adaptive optics (AO) system 100. The light 101 that enters the system 100 may originate from a passive light source (e.g., the sun) or from an active light source such as a laser, a light emitting diode (LED) and the like, after propagation through a medium. The system 100 utilizes a wavefront compensator 104 to convert distorted wavefront 102 to flat wavefront 103 in order to improve the performance of an optical system. The wavefront distortion as a function of position can be measured by a wavefront sensor 107 after passing through a beamsplitter 106. A computer 105 is used to process this information and sets the optical path length, OPL, in the wavefront compensator 104. The compensated wavefront can be imaged by a lens 108 and measured by a camera 109. The distortion is generally caused by variation of refractive index in the propagating medium and can be rapidly changing in time. If the medium is birefringent, the orientation in addition to the magnitude of the refractive index components can also be changing.

In existing AO systems, the compensation is the same for light of all wavelengths and polarization states. The system works well as long as the distortions for different wavelengths and polarization states are the same. For distortion of light that spans a large range of wavelengths and/or different polarization states, there is a need to design AO systems for broadband and polarized light.

Figure 2:
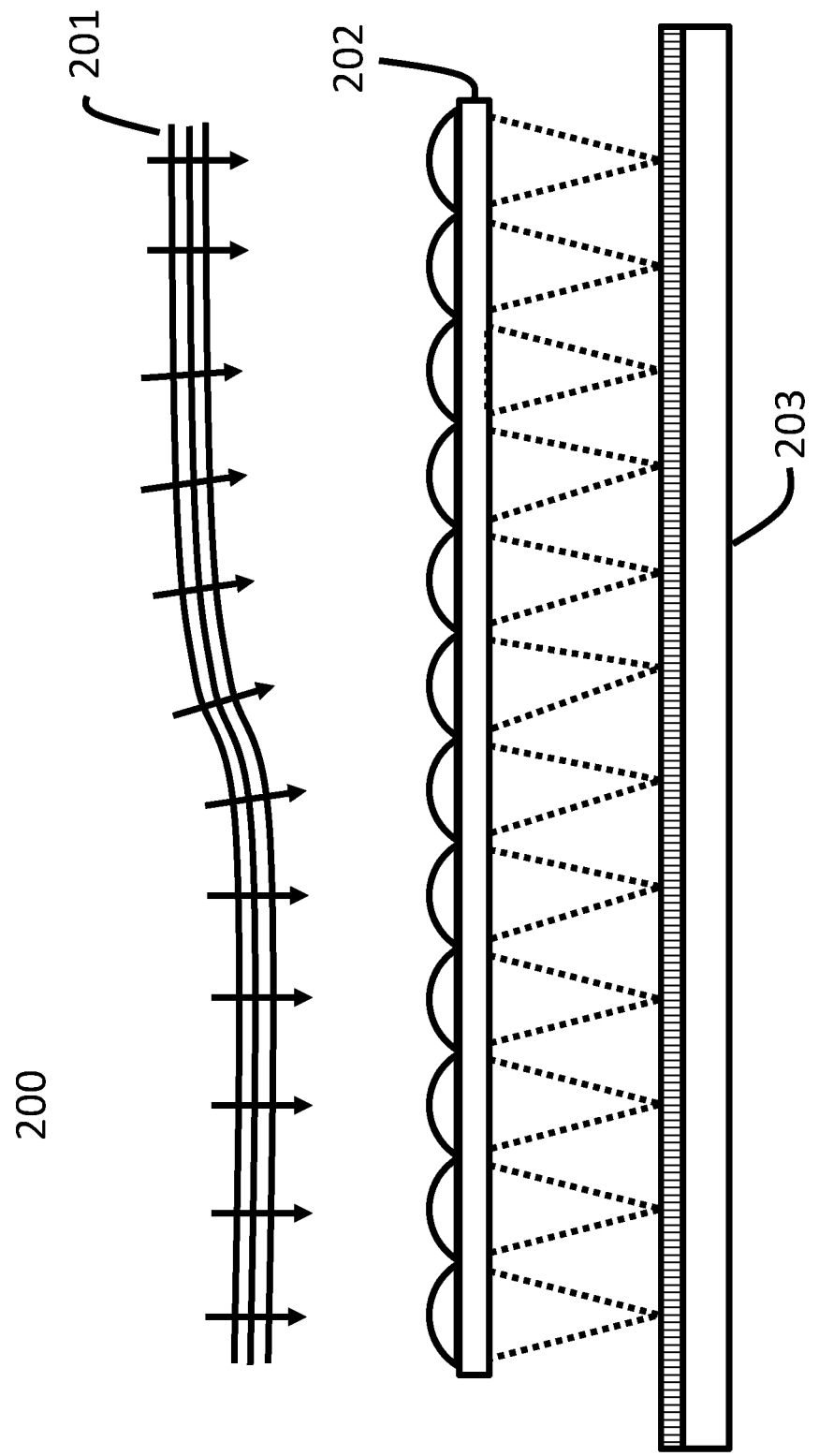
FIG. 2 illustrates a basic configuration of a Shack-Hartmann wavefront sensor.

Two key components of the AO systems are the wavefront sensor and the wavefront compensator. The wavefront sensor is considered first. FIG. 2 shows a Shack-Hartmann wavefront sensor 200, which is a common wavefront sensor used in AO systems because of the simplicity of the computations needed to estimate the wavefront distortion from the wavefront sensor signals. The sensor includes a lens array 202 in front of a sensor array 203. The displacement of the focal spots from the center of each lens gives a measurement of the wavefront 201. The conventional wavefront sensor is color and polarization blind and is sufficient for many applications. Examples of other conventional wavefront sensors include pyramid wavefront sensors, phase-shifting Schlieren sensors, common-path interferometer sensors, Foucault knife-edge wavefront sensors, curvature sensors, holographic wavefront sensors, and shearing interferometer sensors.

In some embodiments of the disclosed technology, the Shack-Hartmann wavefront sensor 200 can be modified to be sensitive to both color and polarization by adding color filters and polarization filters to the detector array 203. For example, bandpass spectral filters can be included that selectively allow a particular spectral range of light to pass through. Similarly, polarization filters can be positioned to allow light with a particular polarization state to reach the sensor array. When both a polarization filter and a spectral filter are used, the wavefront error can be measured for the light having a particular polarization state and a particular spectral content. In one example implementation, one or both of the polarization filter and spectral filter can be replaced with another polarization filter or spectral filter to allow additional measurements for polarization states and/or spectral ranges at different times. In another example implementation, different combinations of polarization-spectral filter can be implemented at a pixel scale, thus allowing the adjacent pixels on the detector to make measurements at different polarization-spectral range combinations. In yet another example implementation, the wavefront can be separated by a beam splitter and passed through a combination of polarization-spectral filters to reach different detector array elements.

Figure 3:
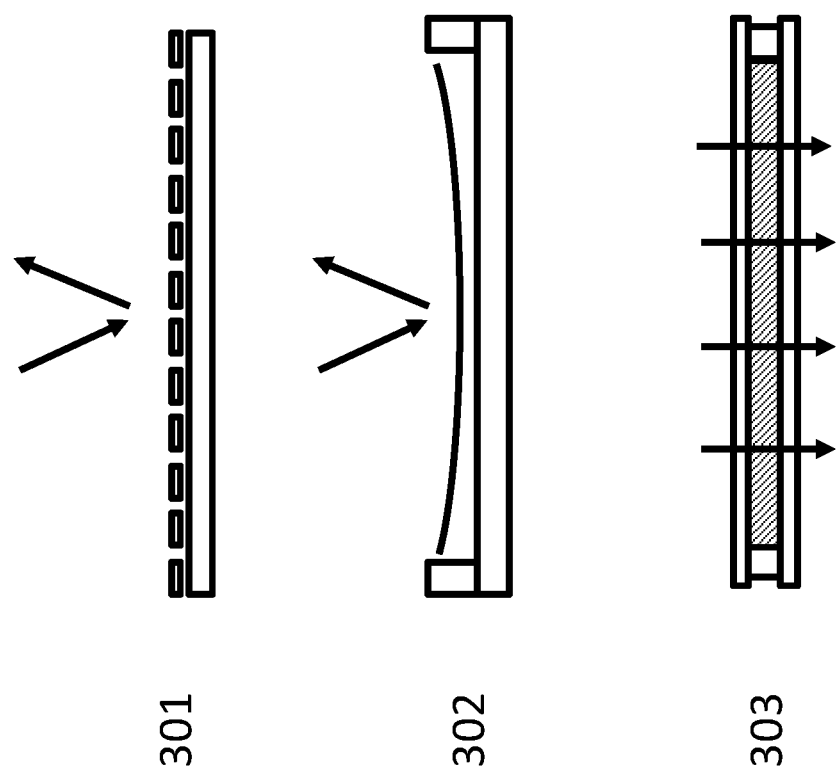
FIG. 3 illustrates example configurations of a wavefront compensator that use an array of mirrors, a deformable mirror, and a liquid crystal device.

There are several ways to construct the wavefront compensator. FIG. 3 shows three common configurations: the first configuration 301 utilizes an array of mirrors 301; the second configuration 302 uses a deformable mirror, and the third configuration 303 uses a liquid crystal device. In these configurations, the mirrors and liquid crystal elements can be actuated in response to signals to provide the needed wavefront corrections. These techniques provide the same correction to the incoming light of different wavelengths and polarization states.

Figure 4:
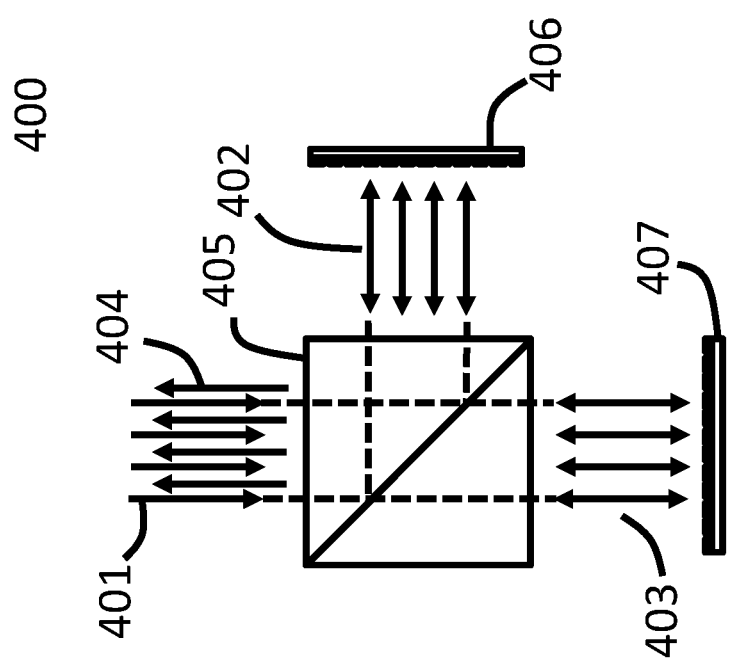
FIG. 4 illustrates a configuration of a wavefront compensator in accordance with an example embodiment.

FIG. 4 shows a modified wavefront compensator 400 in accordance with an example embodiment. Incoming light 401 is split by a beamsplitter 405 into light of different wavelengths and/or polarization states, 402 and 403. Light 402 is incident on a wavefront compensator 406 (e.g., a conventional wavefront compensator), and light 403 is incident on another wavefront compensator 407 (e.g., another conventional wavefront compensator). Light 402 and 403 are recombined into light 404 after being compensated separately. The beamsplitter 405 can be a dichroic beamsplitter which transmits light of one color and reflects light of another color. Alternatively, the beamsplitter 405 can be a polarization beamsplitter which transmits light of one polarization and reflects light of another polarization. Multiple beamsplitters and wavefront compensators can be utilized to separate and to compensate different components of the incident light.

Figure 5:
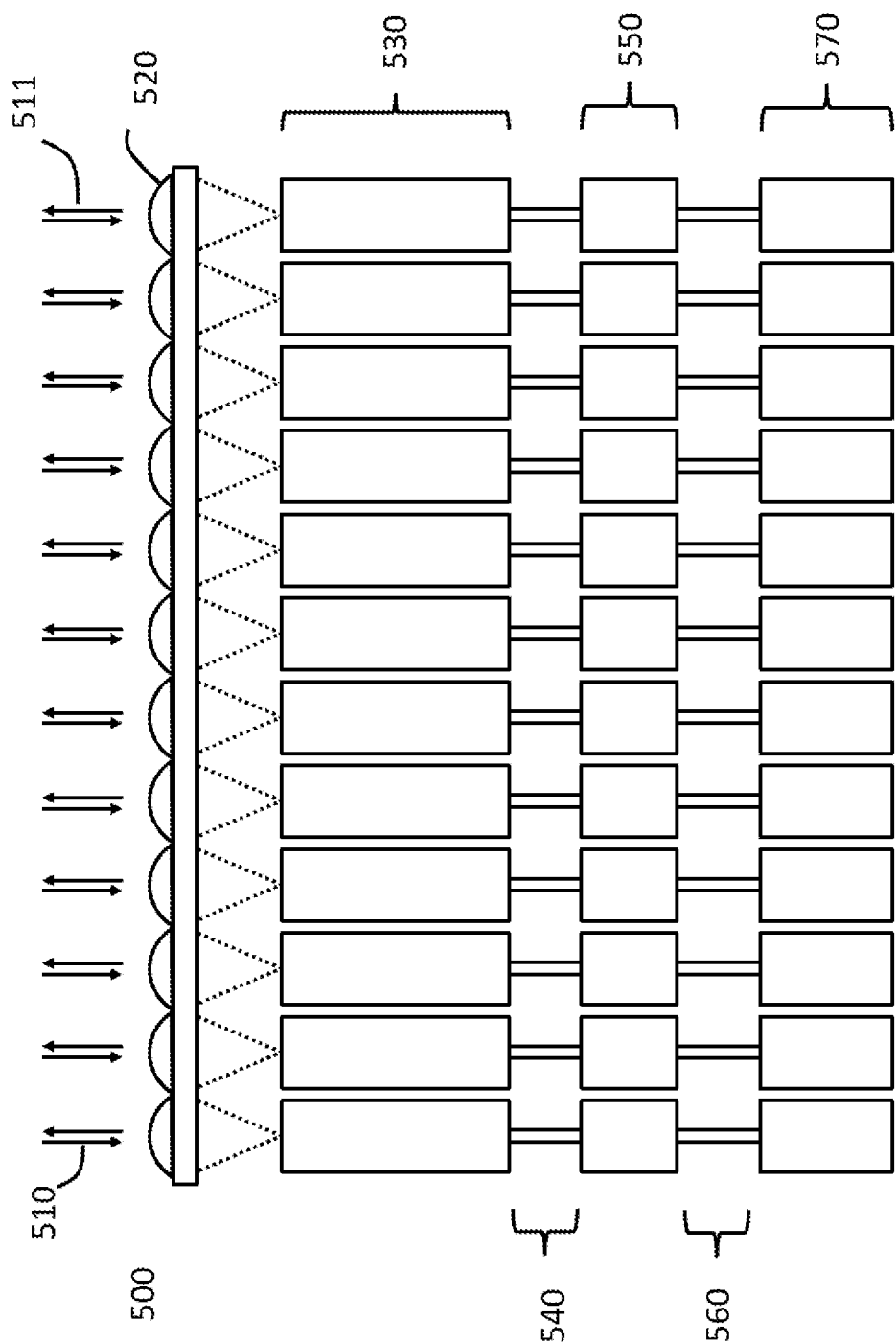
FIG. 5 illustrates a configuration of a wavefront compensator in accordance with another example embodiment.

In another example embodiment as shown in FIG. 5, the wavefront compensator 500 includes an array of optical fibers and fiber devices. Incident light 510 passes through a lens array 520 into a fiber bundle 530. The lens array 520 is generally a two-dimensional array and thus allows spatial sampling of the wavefront in two dimensions. Each fiber in the fiber bundle 530 is connected to a programmable delay line 550 by an optical fiber 540. The purpose of the delay line 550 is to introduce a varying OPL to different sections of incoming light 510. The delay lines 550 are connected to dispersion compensators 570 by fibers 560. The dispersion compensators 570 further introduce different OPLs for light of different wavelengths and reflect the light back to the delay lines 550 and lens array 520. The output light 511 exits the wavefront compensator at the same location as the input light 510. In some embodiments, the delay lines 550 can each introduce the same amount of delay in the optical path, thus imparting the same amount of correction to all sections of input light 510. In some embodiments, both the delay lines 550 and dispersion compensators 570 impart varying amounts of OPL. In general, the combination of the delay lines 550 and dispersion compensators 570 can be used to impart the desired OPL.

Figure 6:
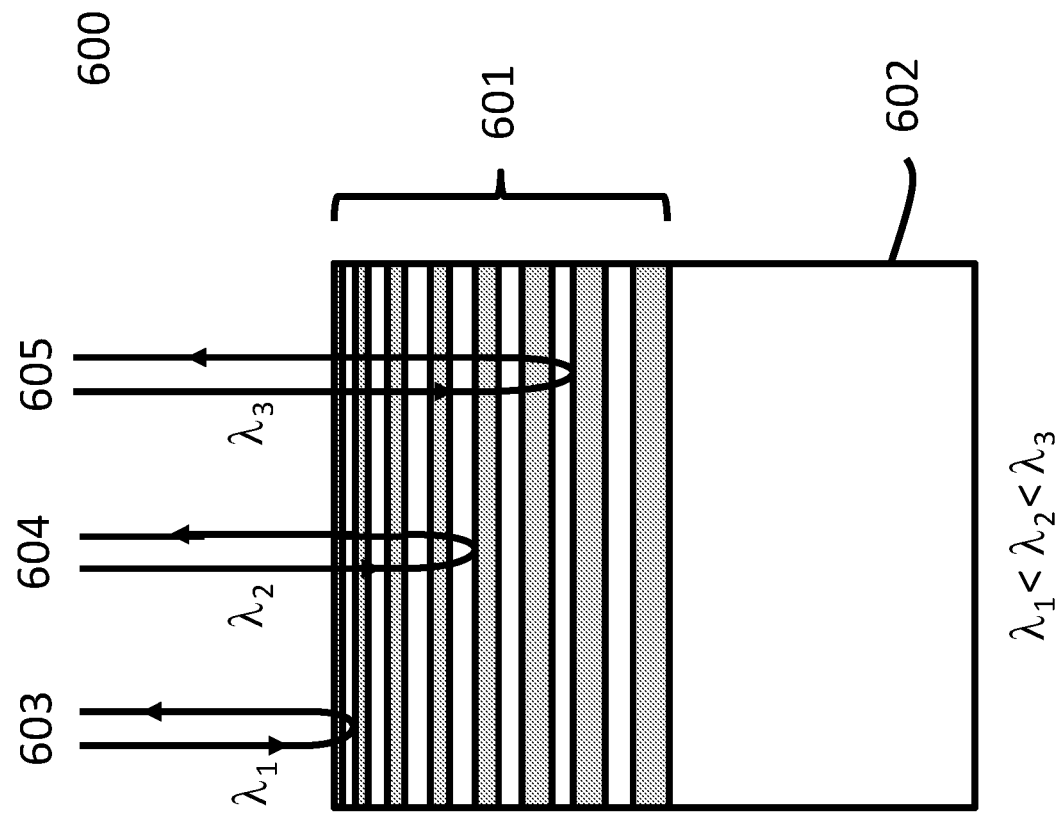
FIG. 6 illustrates an example chirped mirror that includes multiple layers of dielectric materials of varying thicknesses that can be used a part of the disclosed compensators.

In order to understand the operation of the fiber compensator 570, we consider the operation of a chirped mirror. FIG. 6 shows the cross-section of a chirped mirror 600. The mirror is a dielectric dispersive mirror that includes alternating layers 601 of different dielectric materials of varying thicknesses. The different layers can be deposited on a substrate 602. Since the thickness and separation of the layers are not constant, the Bragg wavelength for constructive interference of light is not constant. Light of longer wavelength 605 penetrates deeper into the mirror than light of shorter wavelength 603 and 604. Thus, light of longer wavelength has a longer optical path length (OPL) than light of shorter wavelength after reflection from the chirped mirror 600.

Figure 7:
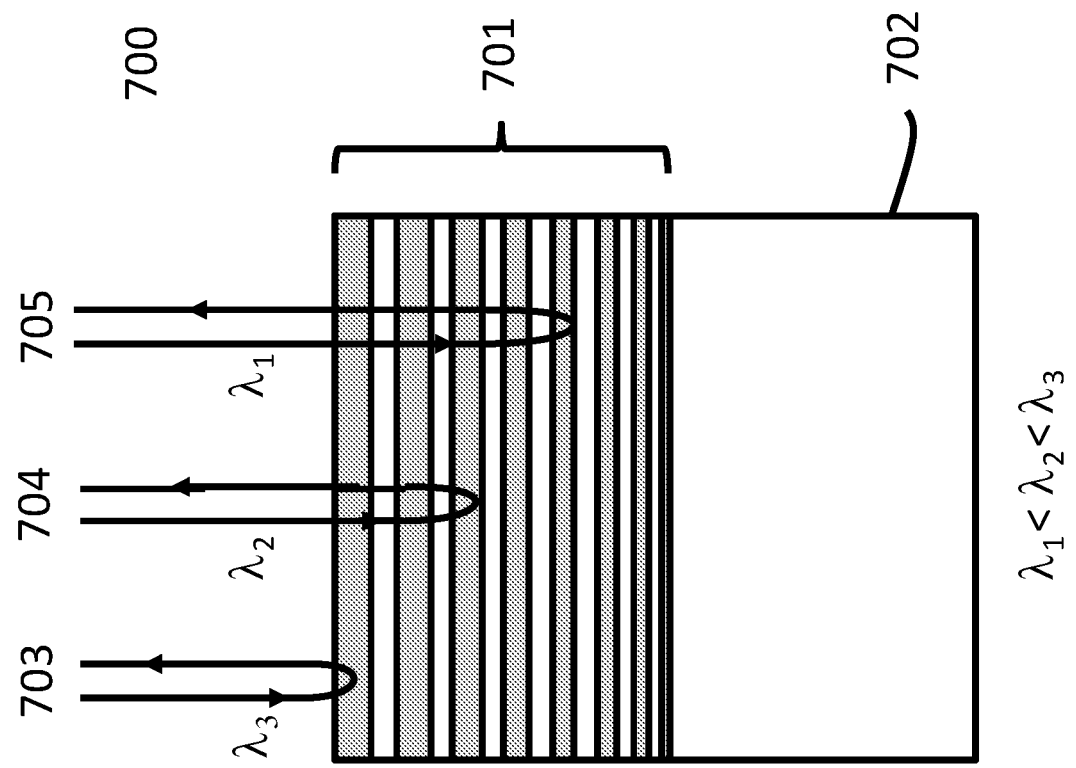
FIG. 7 illustrates another example chirped mirror that includes multiple layers of dielectric materials of varying thicknesses that can be used as part of the disclosed compensators.

FIG. 7 shows the cross-section of another chirped mirror 700. In this design, the different layers are designed in such a way that light of shorter wavelength 705 penetrates deeper into the mirror than light of longer wavelength 703 and 704. A properly designed chirped mirror or dispersion compensator can equalize the OPL of all incoming light of different wavelengths. The mirror can compensate not only for constant group delay dispersion, but also for higher order dispersion.

Figure 8:
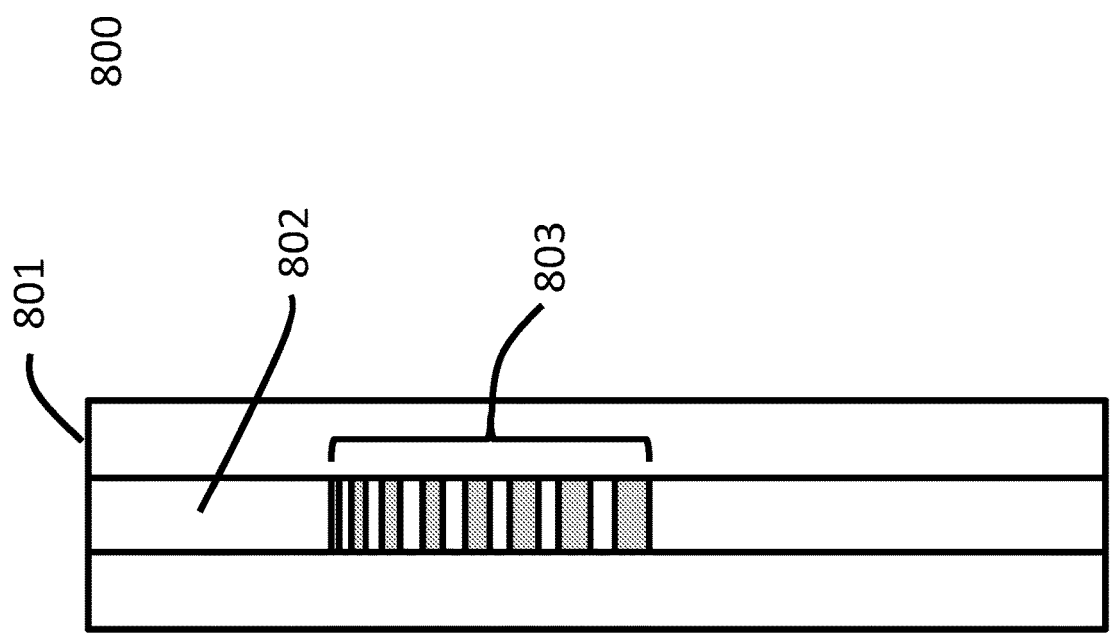
FIG. 8 illustrates an example step index optical fiber configuration that can be used as part of the disclosed compensators.

FIG. 8 shows a cross section of a step index optical fiber 800 that can be used to implement a dispersion compensator. The optical fiber 800 includes a high index core 802 surrounded by a lower index cladding 801. A chirped fiber Bragg grating 803, comprising alternating layers of high and low index regions, is created inside the core of the optical fiber. This type of device can be constructed by exposing the optical fiber by a pattern of intense laser light. The periodicity of the modulated index changes along the axis of the optical fiber. Different wavelengths of light propagating in the fiber are reflected by different portion of the grating. Similar to the chirped mirror, the chirped fiber Bragg grating can introduce different delays to different wavelengths. For simplicity, a step index optical fiber is illustrated in FIG. 8. It is understood, however, that other types of optical waveguide such as photonic crystal fibers, polarization maintaining fibers, graded index fibers, planar waveguide, polymer waveguide and glass waveguide can be utilized.

Figure 9:
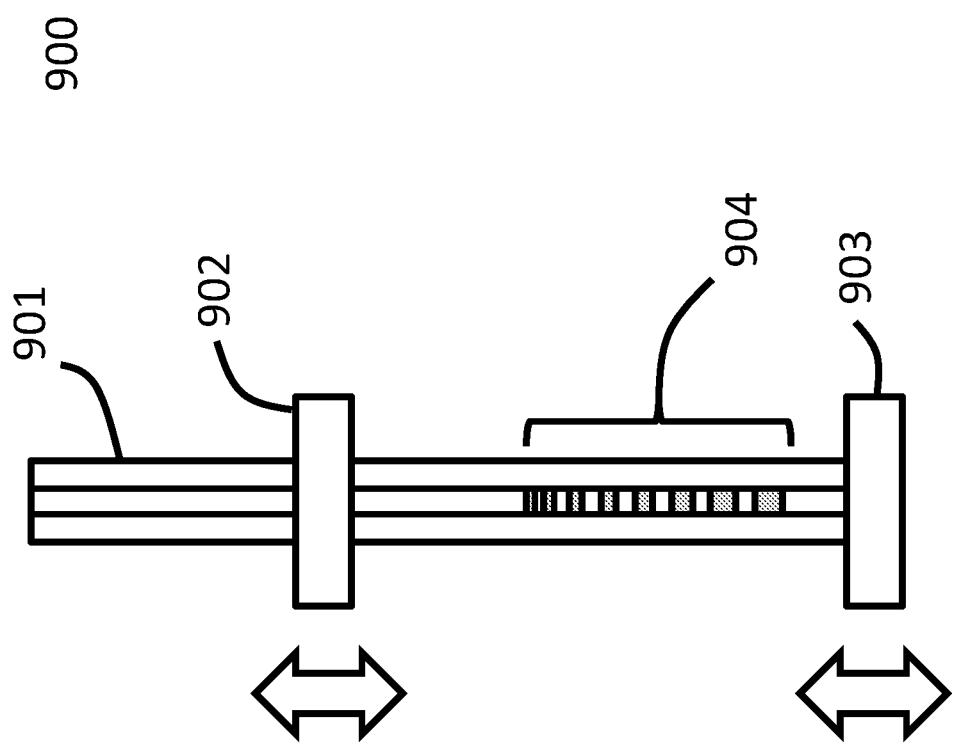
FIG. 9 illustrates a tunable dispersion compensator in accordance with an example embodiment.

FIG. 9 shows a tunable dispersion compensator 900 in accordance with an example embodiment. The tunable dispersion compensator 900 can be used in the AO system in FIG. 5. The compensator includes an optical fiber 901 with a chirped fiber Bragg grating 904. The optical fiber is connected to two piezoelectric transducers 902, 903. Voltages are applied to the transducers 902, 903, which stretch and compress the length of the optical fiber 901 with the chirped fiber Bragg grating 904. The change of the length of the fiber 901 leads to a change in delay of light inside the fiber 901 as the pitch of the grating layers changes. The amount of voltage applied to the piezoelectric transducers 902, 903 depends on the amount of compensation needed and is determined by the output the wavefront sensor. In some embodiments, only one transducer can be used to stretch or compress the fiber. For example, one end (or section) of the fiber on one side of the Bragg grating may be held in place, and a transducer may be connected to another end (or section) of the fiber on the other side of the Bragg grating.

In some embodiments, in additionally or alternatively, the OPL changes may be effectuated by heating and cooling the optical fiber. For example, heating and cooling elements (e.g., a thermoelectric elements) can be coupled to the optical fiber to impart the desired changes in the grating characteristics.

Figure 10:
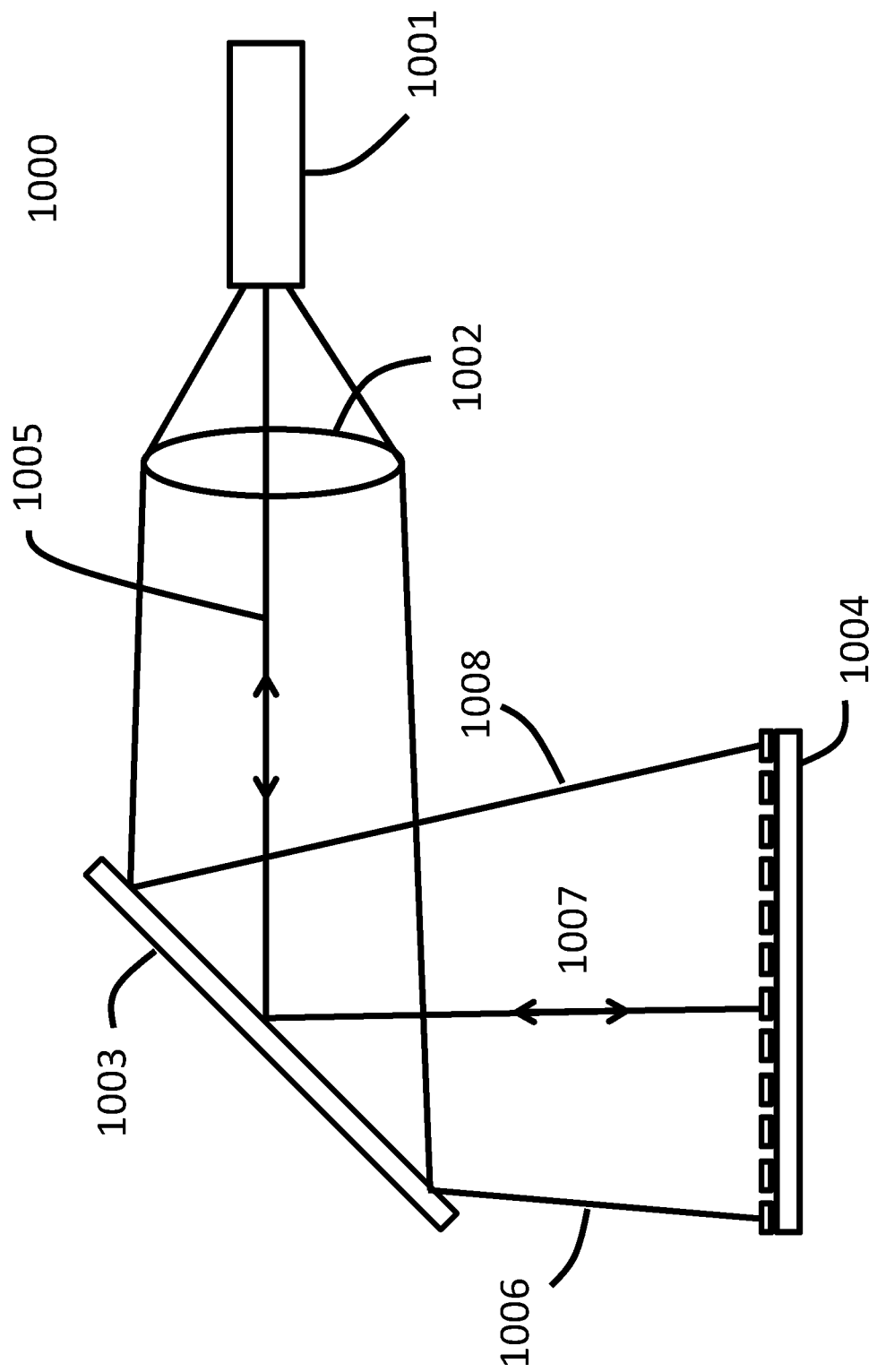
FIG. 10 shows a tunable dispersion compensator in accordance with another example embodiment.

FIG. 10 shows another tunable dispersion compensator 1000 in accordance with an example embodiment that can be used in the AO system in FIG. 5. Light 1005 from an optical fiber 1001 propagates through a lens 1002 onto a grating 1003. The grating 1003 separates the light into different wavelength components 1006, 1007 and 1008, which subsequently are incident on an array of mirrors 1004. Each mirror provides a different OPD for the different wavelength components in real-time. The reflected light travels through the same light path as the incident light and returns into the optical fiber 1001. It should be noted that only three components 1006, 1007, 1008 are shown for illustration purposes, but it is understood that fewer or additional components can be generated within the scope of the disclosed embodiments.

Example Estimations of Chromatic Optical Path Difference

We consider chromatic dispersion which is caused by the wavelength dependence of the refractive index. When light propagates through a medium of refractive index $n(\lambda)$, the OPD, and phase velocity of light, $v_{ph}$, are wavelength dependent.

$$OPD = \int n(\lambda) ds$$

$$v_{ph} = \frac{c}{n(\lambda)}$$

Figure 11:
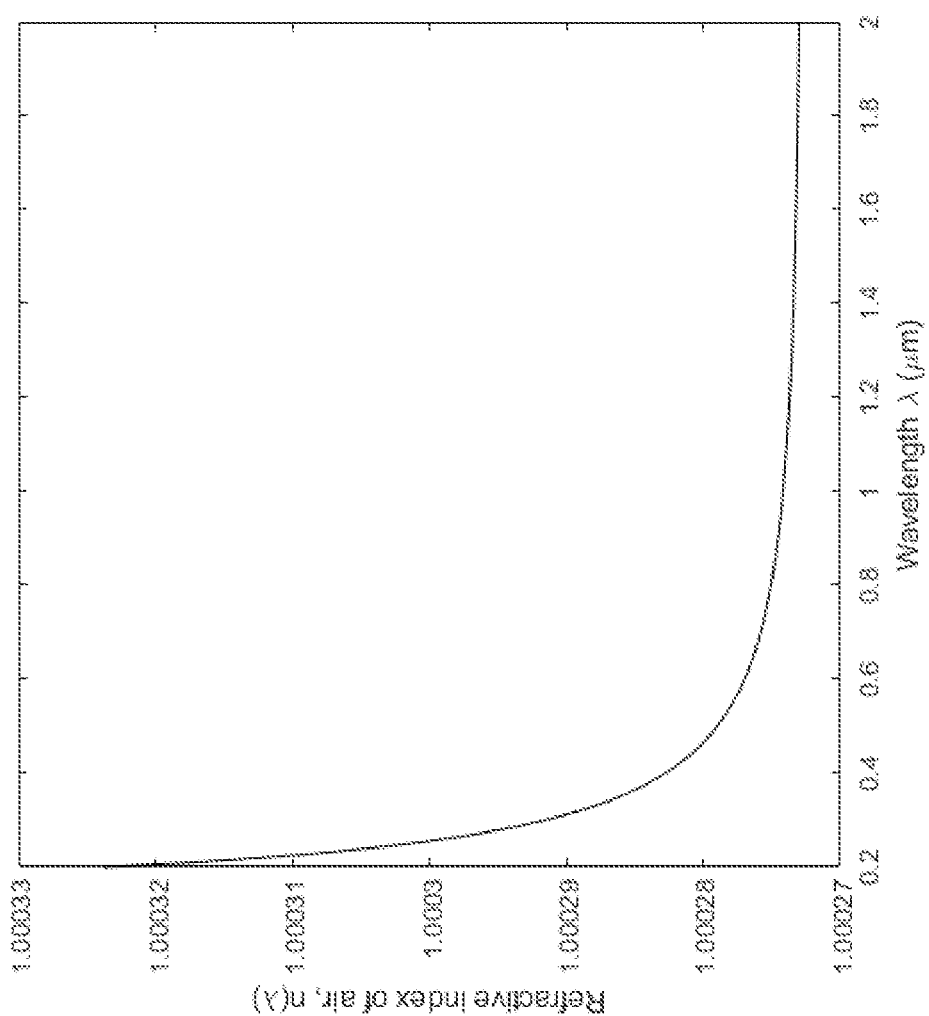
FIG. 11 illustrates a plot of the refractive index of air as a function of wavelength.

Here, ds represents the light path and c is the speed of light. FIG. 11 shows the refractive index of air as a function of wavelength. The index decreases with increasing wavelength. The change in index with wavelength is small in the short wave infrared range (0.9-1.7 µm) and visible range (0.4-0.7 µm) of spectrum and can be relatively large near the ultraviolet region (0.01-0.4 µm). When broadband light propagates through air, light with longer wavelength has a smaller OPD than light with shorter wavelength, because of lower refractive index.

Appendix A includes example estimations of chromatic aberration for light that propagates through a dispersive media with randomly varying index of refraction.

Figure 12:
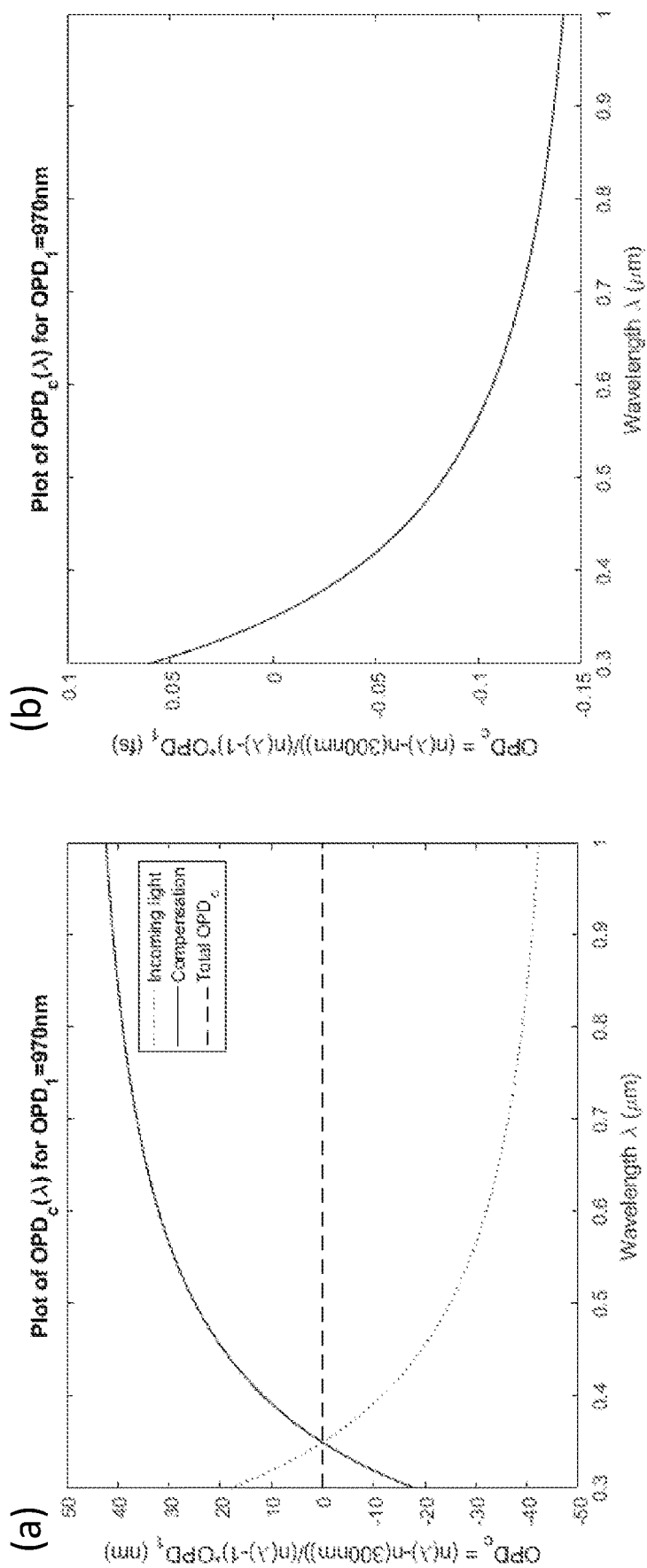
FIG. 12 illustrates plots of chromatic optical path difference, in unites of distance and in units of time, as a function of wavelength.

FIG. 12, in panel (a), shows the chromatic optical path difference, OPDc, for different wavelengths of light propagating through air that is produced based at least in part using the equations in Appendix A. For the plots in panel (a), it is assumed that $OPD_1$=970 nm and $\lambda_2$=300 nm. The dotted plot represents OPDc as a function of wavelength without applied compensation. This OPDc is time dependent and is caused by turbulence in the air in this example plot. The dashed line represents an example of the desired OPD across the wavelength range; the solid line represents that amount of compensation needed as a function of wavelength to achieve the desired OPD. A correctly designed compensator can provide real-time compensation for the different wavelengths as shown by the solid line. In this case, the total OPDc is net zero after compensation. In panel (a) of FIG. 12, OPD is shown in units of distance as nanometer ($10^{-9}$ meter). The same information can be shown in units of time as femtosecond ($10^{-15}$ second), as shown in panel (b) of FIG. 12.

The example plots in FIG. 12 represent examples where the behavior of the OPD associated with the medium can be reasonably estimated based on known models or prior measurements. In such cases, the proper compensation can be provided based on one or more measurements of the wavefront error (e.g., in order to obtain a reference point), and using that point to effectuate the remaining corrections. In some embodiments, the wavefront measurements and associated compensation can be done without prior knowledge of the media dispersion characteristics. In such scenarios, sensing (and the corresponding compensation) is carried out at multiple wavelengths and/or polarization states.

The embodiments disclosed herein can be used to sense and thus correct wavefront errors in AO systems that utilize broadband light with multiple spectral components, as well as multiple polarization states. As noted earlier, some applications of AO systems include systems that look through turbulent media such as air or water or other liquids. In some examples, the disclosed embodiments can facilitate the detection and/or imaging of underwater mines, ocean floor mapping, and underwater inspection of nuclear reactors.

Figure 13:
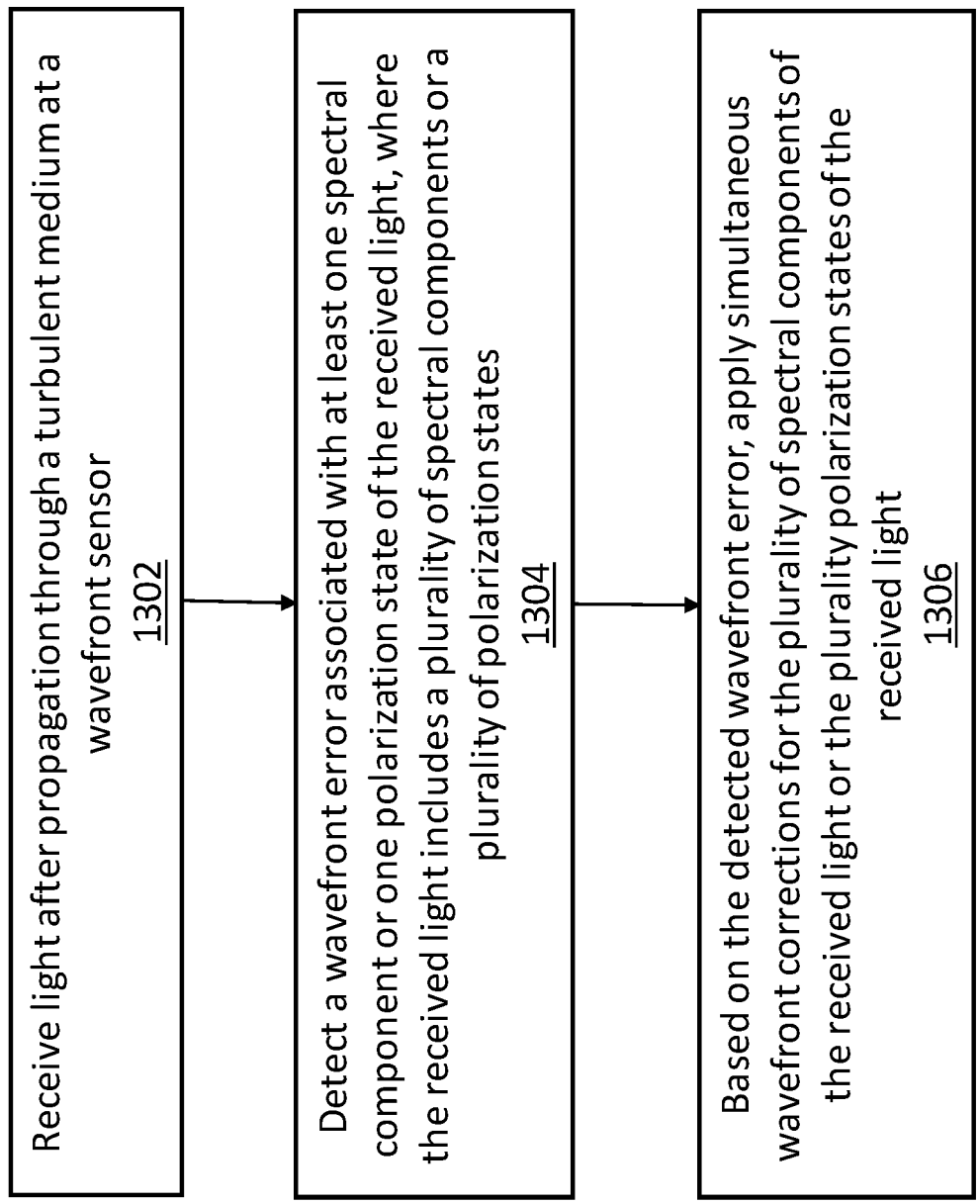
FIG. 13 illustrates a set of operations that can be carried out for compensating wavefront errors in an adaptive optics system in accordance with an example embodiment.

One aspect of the disclosed embodiments relates to a method for compensating wavefront errors in an adaptive optics system, as illustrated by the example operations in FIG. 13. In 1302, light, after propagation through a turbulent medium, is at a wavefront sensor. In 1304, a wavefront error associated with at least one spectral component or one polarization state of the received light are detected. The received light includes a plurality of spectral components or a plurality of polarization states. At 1306, based on the detected wavefront error, simultaneous wavefront corrections for the plurality of spectral components of the received light or the plurality polarization states of the received light are effectuated. In one example embodiment, the above operations further include, prior to effectuating simultaneous wavefront corrections, separating the input light into components each having a particular spectral content or a particular polarization state, and combining the separated components of the input light after simultaneous wavefront corrections have taken place.

Another aspect of the disclosed embodiments relates to a system for sensing and compensating optical wavefront errors that includes an optical wavefront sensor positioned to receive input light after propagation through a turbulent medium and to detect a wavefront error associated with at least one spectral component of the received light, where the input light has a plurality of spectral components. The system further includes a wavefront compensator positioned to receive the input light and to simultaneously effectuate wavefront corrections for the plurality of spectral components of the input light based on the detected wavefront error. The system additionally includes a processor and a memory including instructions stored thereon; the instructions upon execution by the processor configure the processor to receive information indicative of the detected wavefront error, and to provide information to the wavefront compensator to effectuate the wavefront corrections for the plurality of spectral components.

In one example embodiment, the optical wavefront sensor is configured to detect the wavefront error for two or more of the plurality of spectral components within a predefined range of wavelengths, and the wavefront compensator is configured to effectuate simultaneous wavefront corrections for the two or more of the plurality of spectral components within the predetermined range of wavelength based on the detected wavefront errors. In another example, embodiment, the optical wavefront sensor is configured to detect the wavefront error that is associated with a single spectral component, and the wavefront compensator is configured to effectuate wavefront corrections for each of the plurality of spectral components based on the wavefront error associated with the single spectral component and a known spectral dispersion characteristic of the turbulent medium. In yet another example embodiment, the instructions upon execution by the processor configure the processor to use the wavefront error that is associated with the single spectral component as a reference point to determine the wavefront corrections for each of plurality of spectral components based on the known spectral dispersion characteristic of the turbulent medium.

According to one example embodiment, the above noted system for sensing and compensating optical wavefront errors includes one or more filters, beamsplitters or gratings positioned to receive the input light prior to the optical wavefront sensor to allow different spectral components of the input light to reach the optical wavefront sensor and to allow the different spectral components of the input light to be combined after wavefront corrections are effectuated.

In another example embodiment, the system further includes one or more polarization beamsplitters positioned to receive the input light, and to produce two or more components with different polarizations. In this example embodiment, the optical wavefront sensor is configured to detect the wavefront error associated with a plurality of polarized components, and the wavefront compensator is configured to effectuate simultaneous wavefront corrections for the two or more polarized components of the input light based on the detected wavefront error associated with at least one polarized component. In another example embodiment, the optical wavefront sensor includes: a two-dimensional lenslet array positioned to receive the input light, a plurality of bandpass optical filters and polarizers, each configured to allow light within a particular range of wavelengths and a particular polarization state, respectively, to pass therethrough; and a wavelength and polarization sensitive detector positioned to receive the light after passing through one or more combinations of the bandpass optical filters and polarizers.

In one example embodiment, the wavefront compensator includes a plurality of optical fibers, each optical fiber including a grating within a core thereof to impart varying amounts of optical path difference to each of plurality of spectral components. In another example, embodiment, the system also includes one or more transducers coupled to the plurality of optical fibers, where the one or more transducers are configured to compress or stretch one or more of the plurality of optical fibers to enable tuning of the optical path length associated with the one or more optical fibers.

In another example embodiment, the system further includes a lenslet array positioned to receive the input light, and an optical fiber bundle comprising a plurality of optical fibers, where each optical fiber is positioned at a focal plane of a corresponding lenslet in the lenslet array. In this example embodiment, the wavefront sensor comprises a plurality of dispersion compensators positioned to receive a portion of the input light collected by a corresponding lenslet of the lenslet array. In yet another example embodiment, the system also includes a plurality of optical delay elements, where each optical delay element is positioned to receive light that is output from a corresponding optical fiber of the optical fiber bundle and to change an optical path length thereof.

In still another example embodiment, the wavefront compensator includes a diffraction grating positioned to receive the input light and to produce the plurality of spectral components that are spatially separated; the wavefront sensor also includes an array of reflective elements positioned to receive the plurality of the spatially separated spectral components and to impart varying amounts of wavefront corrections to the plurality of spectral components. In one example embodiment, the array of reflective elements includes a plurality of mirrors or a plurality of liquid crystal elements. For example, one or more elements of the array of reflective elements can be moved to a corresponding offset position (from a reference position) to produce an optical path length for light that is incident on the one or more elements that is different from an OPL produced for other elements of the reflective array. In another example embodiment, the system further includes an optical fiber and a lens configured to deliver the input light to the diffraction grating. In yet another example embodiment, the wavefront compensator has a reflective configuration to allow the light reflected from the array of reflective elements to propagate back to the diffraction grating and toward an exit of the wavefront compensator.

In one example embodiment, the system for sensing and compensating optical wavefront errors is part of an adaptive optics (AO) system that is configured to effectuate the wavefront corrections in real-time. In another example embodiment, the optical wavefront sensor is positioned to receive the input light after propagation through one of: air or a liquid. In still another example embodiment, the input light is originated from one of a laser or a light emitting device (LED).

Another aspect of the disclosed embodiments relates to a wavefront compensator for use in an adaptive optics system; the wavefront sensor includes a two-dimensional lenslet array positioned to receive input light that includes wavefront errors, an optical fiber bundle comprising a plurality of optical fibers, where each optical fiber is positioned at a focal point of a corresponding lenslet in the lenslet array. The wavefront sensor further includes a plurality of optical delay elements, where each optical delay element is positioned to received light from a corresponding optical fiber and to change an optical path length of the light incident thereon. The wavefront sensor also includes a plurality of dispersion compensators positioned to receive light that is output from a corresponding optical delay element; each dispersion compensator is configured to modify an optical path length of the light received by the dispersion compensator as a function of spectral contents thereof. In one example embodiment, the plurality of dispersion elements is in a reflective configuration to allow the light that propagates through each dispersion element to be reflected back through the dispersion element, propagate back through the corresponding optical delay element and exit through a corresponding lenslet of the lenslet array.

In another example embodiment, each of the plurality of dispersion elements includes an optical fiber, and each optical fiber includes a grating within a core thereof to impart varying amounts of optical path length to different spectral components of light that are incident on the grating. In one example embodiment, the grating is a chirped Bragg grating. In another example embodiment, the above wavefront sensor also includes one or more transducers coupled to each optical fiber to compress or stretch the optical fiber and to modify a pitch of the grating.

Another aspect of the disclosed embodiments relates to a system for sensing and compensating optical wavefront errors that includes one or more optical wavefront sensors positioned to receive input light after propagation through a turbulent medium and to detect a wavefront error associated with: (a) at least one spectral component of the received light, wherein the input light includes a plurality of spectral components, or (b) different polarizations of the received light. Such a system also includes one or more wavefront compensators positioned to receive the input light and to simultaneously effectuate wavefront corrections for one or both of: (A) the plurality of spectral components of the input light based on the detected wavefront error, or (B) a plurality of polarized light components having the different polarizations.

Another aspect of the disclosed embodiments relates to a system for sensing and compensating optical wavefront errors that includes one or more optical wavefront sensors positioned to receive input light after propagation through a turbulent medium and to detect a wavefront error associated with different polarizations of the received light. Such a system for sensing and compensating optical wavefront errors also includes one or more wavefront compensators positioned to receive the input light and to simultaneously effectuate wavefront corrections for a plurality of polarized light having the different polarizations.

Another aspect of the disclosed embodiments relates to a wavefront sensor for use in an adaptive optics system; the wavefront sensor includes a two-dimensional lenslet array positioned to receive input light that includes wavefront errors, a plurality of bandpass optical filters and polarizers, each configured to allow light within a particular range of wavelengths and a particular polarization state, respectively, to pass therethrough, and a wavelength and polarization sensitive detector positioned to receive the light after passing through one or more combinations of the bandpass optical filters and polarizers.

The disclosed systems can include at least one processor and/or controller, at least one memory unit that is in communication with the processor, and at least one communication unit that enables the exchange of data and information, directly or indirectly, through the communication link with other entities, devices, databases and networks. For example, such processors, controllers, and the associated memory and communication unit can be incorporated as part of the computer 105 in FIG. 1. The communication unit may provide wired and/or wireless communication capabilities in accordance with one or more communication protocols, and therefore it may comprise the proper transmitter/receiver, antennas, circuitry and ports, as well as the encoding/decoding capabilities that may be necessary for proper transmission and/or reception of data and other information. For example, the communication unit may provide signals and control to piezoelectric transducers 902, 903 that are shown in FIG. 9.

The processor(s) may include central processing units (CPUs) to control the overall operation of, for example, the host computer. In certain embodiments, the processor(s) accomplish this by executing software or firmware stored in memory. For example, the processor may be programmed to process the information that it obtained from the wavefront sensors, to make computations to determine the amount of compensation is needed to correct wavefront errors, and to provide signals to effectuate movement of optical and electrooptical elements. The processor(s) may be, or may include, one or more programmable general-purpose or special-purpose microprocessors, digital signal processors (DSPs), programmable controllers, application specific integrated circuits (ASICs), programmable logic devices (PLDs), graphics processing units (GPUs), or the like, or a combination of such devices.

The memory represents any suitable form of random access memory (RAM), read-only memory (ROM), flash memory, or the like, or a combination of such devices. In use, the memory may contain, among other things, a set of machine instructions which, when executed by processor, causes the processor to perform operations to implement certain aspects of the presently disclosed technology.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Various information and data processing operations described herein may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. Particular sequence of such executable instructions or associated data structures represents examples of corresponding acts for implementing the functions described in such steps or processes. Only a few implementations and examples are described and other implementations, enhancements and variations can be made based on what is described and illustrated in this patent document.

Appendix A—Chromatic Aberration in Random Media

The OPD between phase fronts at wavelengths λ1 and λ2 propagating through a dispersive medium with indices $n_1$ and $n_2$ is:

$$OPD = \int_0^L (n_1(l) - n_2(l)) dl \qquad (A-1)$$

In Eq. (A-1), the indices are taken to vary randomly along the path L. We can write each index as the sum of a mean value and a random component, which we attribute to fluctuations in the properties of the medium. In air, the principal driver of the variations will be temperature.

$$n_x(l) = n_{0,x} + \delta n_x. \qquad (A-2)$$

Hence, $$OPD = L(n_{0,1} - n_{0,2}) + \int_0^L (\delta n_1(l) - \delta n_2(l)) dl. \qquad (A-3)$$

The first term is simply the dispersive delay between the two phase fronts and is irrelevant in this context. The second term contains the chromatic change in the scale of the aberration.

Now, to a good approximation, the temperature-induced variation in the index of air depends on the wavelength in the same manner as the index itself, which leads to:

$$\delta n_x(l) \propto n_{0,x} - 1. \qquad (A-4)$$

So the chromatic OPD between the wave fronts at the two wavelengths is:

$$OPD_c = \int_0^L \delta n_1(l) \left( \frac{n_{0,1} - n_{0,2}}{n_{0,1} - 1} \right) dl \qquad (A-5)$$

$$= \left( \frac{n_{0,1} - n_{0,2}}{n_{0,1} - 1} \right) OPD_1 \qquad (A-6)$$

where $OPD_1$ is the wave-front aberration at wavelength $\lambda_1$.

As a specific example, consider wavelengths of $\lambda_1 = 500$ nm and $\lambda_2 = 350$ nm for which $n_{0,1} = 1.00027897$ and $n_{0,2} = 1.00028612$ at standard temperature and pressure. The aberration scaling of Eq. (A-6) is a factor of −0.0256. Now consider the chromatic effect over a 2 meter telescope observing these wavelengths through Kolmogorov atmospheric turbulence characterized by a Fried parameter $r_0 = 10$ cm at 500 nm wavelength (moderately bad site). The mean square aberration at 500 nm will be $$1.013 \left( \frac{D}{r_0} \right)^{5/3} = 149 \text{ rad}^2,$$

equivalent to 970 nm rms. The difference at 350 nm will be 970×0.0256=25 nm. This is the component that would have to be removed by the chromatic behavior of the deformable mirror.

What is claimed is:

1. A system for sensing and compensating optical wavefront errors, comprising:
   an optical wavefront sensor positioned to receive input light after propagation through a turbulent medium and to detect a wavefront error associated with at least one spectral component of the received light, the input light having a plurality of spectral components;
   a wavefront compensator positioned to receive the input light and to simultaneously effectuate wavefront corrections for the plurality of spectral components of the input light based on the detected wavefront error, wherein the wavefront corrections correct at least in-part chromatic aberrations associated with the turbulent medium based on wavelength dependence of refractive index of the turbulent medium; and
   a processor and a memory including instructions stored thereon, wherein the instructions upon execution by the processor configure the processor to receive information indicative of the detected wavefront error, and to provide information to the wavefront compensator to effectuate the wavefront corrections for the plurality of spectral components.

2. The system of claim 1, wherein:
   the optical wavefront sensor is configured to detect the wavefront error for two or more of the plurality of spectral components within a predefined range of wavelengths, and
   the wavefront compensator is configured to effectuate simultaneous wavefront corrections for the two or more of the plurality of spectral components within the predetermined range of wavelength based on the detected wavefront errors.

3. The system of claim 1, wherein:
   the optical wavefront sensor is configured to detect the wavefront error that is associated with a single spectral component, and
   the wavefront compensator is configured to effectuate wavefront corrections for each of the plurality of spectral components based on the wavefront error associated with the single spectral component and a known spectral dispersion characteristic of the turbulent medium.

4. The system of claim 3, wherein the instructions upon execution by the processor configure the processor to use the wavefront error that is associated with the single spectral component as a reference point to determine the wavefront corrections for each of plurality of spectral components based on the known spectral dispersion characteristic of the turbulent medium.

5. The system of claim 1, including one or more filters, beamsplitters or gratings positioned to receive the input light prior to the optical wavefront sensor to allow different spectral components of the input light to reach the optical wavefront sensor and to allow the different spectral components of the input light to be combined after wavefront corrections are effectuated.

6. The system of claim 1, further comprising:
   one or more polarization beamsplitters positioned to receive the input light, and to produce two or more components with different polarizations, wherein:
   the optical wavefront sensor is configured to detect the wavefront error associated with a plurality of polarized components, and
   the wavefront compensator is configured to effectuate simultaneous wavefront corrections for the two or more components with different polarizations based on the detected wavefront error associated with at least one of the polarized components.

7. The system of claim 6, wherein the optical wavefront sensor includes:
   a two-dimensional lenslet array positioned to receive the input light, a plurality of bandpass optical filters and polarizers, each configured to allow light within a particular range of wavelengths and a particular polarization state, respectively, to pass therethrough; and a wavelength and polarization sensitive detector positioned to receive the light after passing through one or more combinations of the bandpass optical filters and polarizers.

8. The system of claim 1, wherein the wavefront compensator includes a plurality of optical fibers, each optical fiber including a grating within a core thereof to impart varying amounts of optical path difference to each of plurality of spectral components.

9. The system of claim 8, further comprising one or more transducers coupled to the plurality of optical fibers, the one or more transducers configured to compress or stretch one or more of the plurality of optical fibers to enable tuning of the optical path length associated with the one or more optical fibers.

10. The system of claim 1, further comprising:
a lenslet array positioned to receive the input light; and
an optical fiber bundle comprising a plurality of optical fibers, each optical fiber positioned at a focal plane of a corresponding lenslet in the lenslet array; wherein
the wavefront sensor comprises a plurality of dispersion compensators positioned to receive a portion of the input light collected by a corresponding lenslet of the lenslet array.

11. The system of claim 10, further comprising:
a plurality of optical delay elements, each positioned to receive light that is output from a corresponding optical fiber of the optical fiber bundle and to change an optical path length thereof.

12. The system of claim 1, wherein the wavefront compensator includes:
a diffraction grating positioned to receive the input light and to produce the plurality of spectral components that are spatially separated; and
an array of reflective elements positioned to receive the plurality of the spatially separated spectral components and to impart varying amounts of wavefront corrections to the plurality of spectral components.

13. The system of claim 12, wherein the array of reflective elements includes a plurality of mirrors or a plurality of liquid crystal elements.

14. The system of claim 12, further comprising an optical fiber and a lens configured to deliver the input light to the diffraction grating.

15. The system of claim 12, wherein the wavefront compensator has a reflective configuration to allow the light reflected from the array of reflective elements to propagate back to the diffraction grating and toward an exit of the wavefront compensator.

16. The system of claim 1, wherein the refractive index of the turbulent medium includes a mean value and a random component that represents fluctuations in dispersive properties of the turbulent medium.

17. A wavefront compensator for use in an adaptive optics system, the wavefront sensor comprising:
a two-dimensional lenslet array positioned to receive input light having propagated through a turbulent medium and includes wavefront errors;
an optical fiber bundle comprising a plurality of optical fibers, each optical fiber positioned at a focal point of a corresponding lenslet in the lenslet array;
a plurality of optical delay elements, each optical delay element positioned to received light from a corresponding optical fiber and to change an optical path length of the light incident thereon; and
a plurality of dispersion compensators positioned to receive light that is output from a corresponding optical delay element, each dispersion compensator configured to modify an optical path length of the light received by the dispersion compensator as a function of spectral contents thereof to provide wavefront corrections that correct at least in-part chromatic aberrations associated with the turbulent medium based on wavelength dependence of refractive index of the turbulent medium.

18. The wavefront compensator of claim 17, wherein each of the plurality of dispersion elements comprises an optical fiber, each optical fiber including a grating within a core thereof to impart varying amounts of optical path length to different spectral components of light that are incident on the grating.

19. A system for sensing and compensating optical wavefront errors, comprising:
one or more optical wavefront sensors positioned to receive input light after propagation through a turbulent medium and to detect a wavefront error associated with:
at least one spectral component of the received light, wherein the input light includes a plurality of spectral components, or
different polarizations of the received light; and
one or more wavefront compensators positioned to receive the input light and to simultaneously effectuate wavefront corrections for one or both of:
the plurality of spectral components of the input light based on the detected wavefront error, or
a plurality of polarized light components having the different polarizations, wherein the wavefront corrections corresponding to the plurality of spectral components correct at least in-part chromatic aberrations associated with the turbulent medium based on wavelength dependence of refractive index of the turbulent medium.

20. A method for compensating wavefront errors in an adaptive optics system, comprising:
receiving light after propagation through a turbulent medium at a wavefront sensor;
detecting a wavefront error associated with at least one spectral component or one polarization state of the received light, wherein the received light includes a plurality of spectral components or a plurality of polarization states; and
based on the detected wavefront error, effectuating simultaneous wavefront corrections for the plurality of spectral components of the received light or the plurality polarization states of the received light, wherein the wavefront corrections corresponding to the plurality of spectral components correct at least in-part chromatic aberrations associated with the turbulent medium based on wavelength dependence of refractive index of the turbulent medium.

21. The method of claim 20, further comprising:
prior to effectuating simultaneous wavefront corrections, separating the received light into components each having a particular spectral content or a particular polarization state, and
combining the separated components of the received light after simultaneous wavefront corrections have taken place.

* * * * *